EGT

Jan. 28, 1975 R. N. SILVA Re. 28,323

CONTINUOUS CLARIFICATION-FILTRATION METHOD

Original Filed Oct. 7, 1968 2 Sheets-Sheet 1

INVENTOR.

René Mario Silva

CONTINUOUS CLARIFICATION-FILTRATION METHOD

Original Filed Oct. 7, 1968

2 Sheets-Sheet 2

INVENTOR.

Dario Gerardo Silva

United States Patent Office

Re. 28,323
Reissued Jan. 28, 1975

28,323
CONTINUOUS CLARIFICATION-FILTRATION METHOD

Rene N. Silva, 110 S. Maple Ave.,
Ridgewood, N.J. 07450

Original No. 3,642,618, dated Feb. 15, 1972, Ser. No. 765,507, Oct. 7, 1968. Application for reissue Feb. 14, 1973, Ser. No. 332,412
Int. Cl. B03d *1/00*
U.S. Cl. 210—44 4 Claims

Matter enclosed in heavy brackets [ ] appears in the original patent but forms no part of this reissue specification; matter printed in italics indicates the additions made by reissue.

ABSTRACT OF THE DISCLOSURE

Method and apparatus to improve the adhesion between the air or gas bubbles used in a flotation clarifier and the floc already formed with the use of one or more chemicals or coagulant aids, by adding the necessary electrical charge to said air or gas bubbles in order to make them adhere more efficiently to said floc.

This invention relates to clarifiers, and more particularly relates to flotation method and apparatus which I call continuous clarification-filtration because of its good performance, and is intended to be applied to clarify sugar solutions but it can be used for clarifying any liquid. In the past, it has been customary in flotation practice to aerate the liquid being treated without taking care of the electrical charge of the air or gas bubbles which were supposed to adhere to the floc, fiber, etc., being floated. However, many times it was found that the air or gas bubbles did not adhere to the floc, fiber, etc., as expected, but passed upward until reaching the liquid level without even touching the floc, fiber, etc. Various methods have been devised to counteract these conditions. The use of coagulants and polyelectrolytes have been solving the problem up to the present, but its wide use in this field have never been a definite help.

Besides it has been found that even though a successful lab test could be made with a liquid, perfectly floating its floc, fiber, etc., when the same liquid is tried in a larger scale, adding the same proportion of flocculating aid if required, not always do the air or gas bubbles adhere to the floc, fiber, etc., as the lab test did. The above behavior shows that a change in the electrical charges of the floc, fiber, etc., and/or of the air or gas bubbles has occurred. It is known that when two different materials are in contact, electrons from one material can move across the boundary and associate with the other. These electrons align themselves near the interface since the first material now has a slight positive charge. Although the distance between the negative and positive charges is extremely small, an electrical field and a difference in potential now exist. The voltage across their "electrical double layer," called the "contact" or "zeta" potential, is only 0.001 to 0.1 volt.

If the two materials in contact are good conductors of electricity, and are now separated, the excess electrons in one material will return to the other one before final contact is broken. But if one (or both) of the materials is an insulator, this flow will be impeded; if the separation is done rapidly enough, some of the excess electrons will be trapped in one of the materials. Then both materials will be charged. If one of the materials is a grounded conductor it, of course, will not retain its charge, but in the case of a pressurized liquid passing at high velocity through a valve and being released within the flotation tank proper, the charge of the floc could be changed even though the conductive liquid would transmit the excess electrical charge to the ground. This explains why some successful tests carried on with a flotation kit cannot be reproduced with a pilot unit or an industrial unit. It must be understood that the two materials or phases in initial contact may be two solids, two immiscible liquids, a solid and a liquid, a solid and a vapor or gas, a liquid and a vapor or gas. The important point to keep in mind is that whenever there is contact and separation of phases a charge may be developed that could be disastrous.

In a standard flotation unit, when the pressurized liquid is released in the flotation tank proper, static electricity could develop in or near the release valve itself, at or near the point where a high velocity flow is produced. If the releasing valve and the liquid are good conductors, change in the charge of the floc may not happen. However, if the valve is made of an insulating material like rubber, a change in electrical charges will happen. This change could improve or harm the attraction between the floc, fibers, etc., and the air or gas bubbles, depending on what the floc charges were, what changes happened to the air or gas bubbles, and what changes happened to the floc itself. Sometimes I have even found that a complete destruction of the floc occurs because when the pressurized liquid is released, the floc is broken by the turbulence, as normally happens, but at the same time its electrical charges as well as the electrical charge of the air or gas bubbles are changed to the same electrical charge, which means that pieces of floc would not be attracted between themselves, nor between themselves and the air or gas bubbles. Actually, they are repelled.

The above difficulties with flotation of floc, fiber, etc., led me to my invention where I control the electric charges in the floc and or in the air or gas bubbles, which I can do through different approaches: the first relies on small bubbles of gas or air coming up from the bottom and in countercurrent with the liquid being clarified, said bubbles carrying one or more chemicals in powder form, which has or have been charged electrically positively or negatively, according to the demand of the liquid being treated, by using an electrostatic charger 7 which charges small particles passing through it, negatively or positively, as required and making these charged particles to travel within relative small gas or air bubbles through the liquid being clarified. In this way we accomplish the purpose of a sure adhesion of the bubble to the matter we want to take out of the liquid, being understood that this matter has already been flocculated or is being flocculated by the chemical carried by the gas or air bubbles. With this method we overcome the disadvantage of producing static electricity.

It must be understood that the charged powdered chemical particles, will be electrically discharged as soon as they get in direct contact with the water. Therefore, the larger the air or gas bubbles, the more probabilities for the charged chemical of not being discharged and of adhering to the floc. However, it is also a fact that the smaller the bubbles the more time the bubble is maintained adhered to the floc.

The second approach is obtained through ionizing the air or gas being bubbled with a source of radioactivity. The minimum ionization in air is about 50 ion pairs per cm. of path, and is produced, for example, by electrons having an energy of the order of 1 mev. Another approach would be by electromagnetic irradiation associated with sodium vapor light and the like. A fourth approach would be the use of a plastic or insulated release valve to partially regulate the increase or decrease of an electric charge. However, change from positive to negative and vice versa can not be made with this approach. One object of this invention is to neutralize any undesirable charge that could be produced during the release of the pressure of the liquid according to the above explanation.

Another object of the present invention is to give to the air bubble the specific electrical charge.

A further object of the present invention is to provide simple, durable, and efficient flotation apparatus in which controls are provided to control the amount of electrostatic charge required for a good adhesion to the floc.

Another further object of the present invention is to provide a selective control to charge positively or negatively the air or gas bubble as required.

The practice of the invention will be best understood by reference to the accompanying drawings. In the drawings, in the several views of which like parts have been designated similarly:

Figure 2:
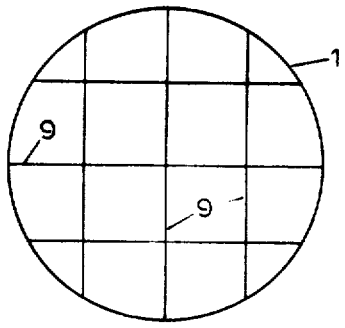
FIG. 2 is Section A—A of FIG. 1.
Figure 1:
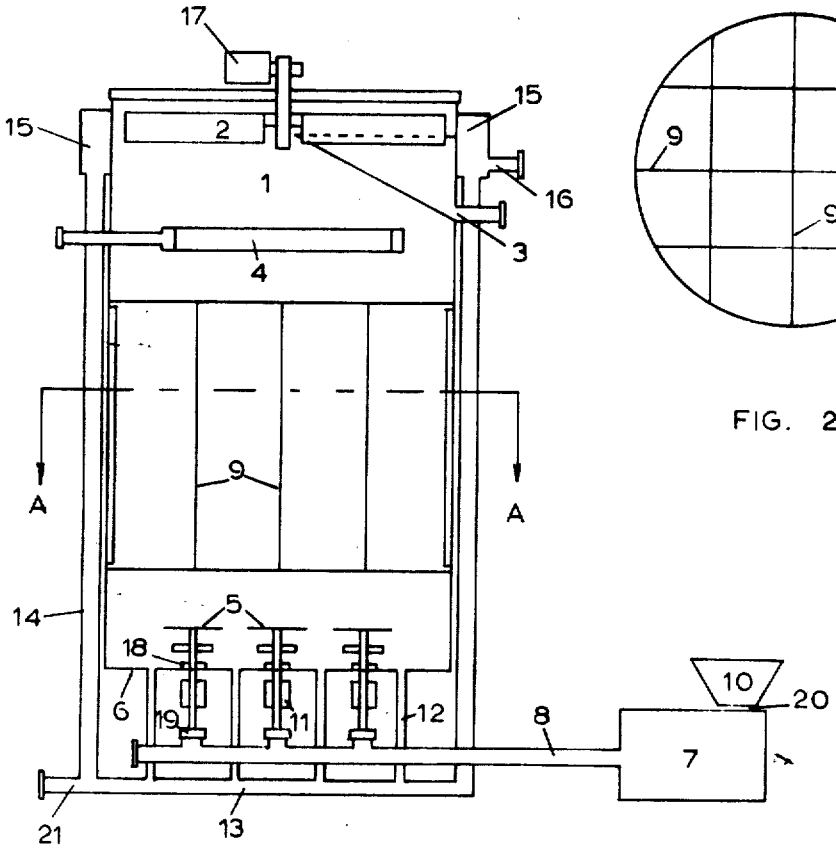
FIG. 1 is an elevation of one embodiment of this invention.

One embodiment of this invention consists of a circular (but may be square) tank 1 as shown in FIGS. 1 and 2 with a top skimmer 2 and collector 3.

From 1 to 3 feet under the skimmer 2 which is driven by a motor 17, there is an inlet distributor 4 to distribute evenly the incoming liquid. At the bottom 6 of the tank 1 there are several gas diffusers 5 as shown in FIG. 1, the number of diffusers being dependent on the capacity of the unit. These diffusers 5 comprise a hollow shaft 70, a centrifugal blower 71, and a circular plate 72 with holes 73.

The hollow shaft 70 is connected to air or gas. The gas blower 71 is of the centrifugal type and is used to draw gases through the hollow shaft 70 and bubble it in the liquid through its peripheric outlets. The shape of the blower blades are not described because any suitable centrifugal blower can do the job. The only special specification is that said blower must produce a minimum of turbulence in the surrounding liquid.

When the air or gas leaves the peripheric holes of the blower 71 which is rotating, the gas is divided in small bubbles. Said bubbles tend to go up, finding in their ascending pass the circular plate 72 which permits said bubbles to pass through holes 73, but at the same time cutting said bubbles in smaller bubbles so that the final diameter of said bubbles depends on the side of the holes 73 and in the speed at which the plate 72 revolves. Between the inlet distributor 4 and the gas diffusers 5 there are several vertical partitions 9 as shown in FIGS. 1 and 2, equally spaced to form vertical square cells in order to avoid unnecessary movement of the liquid within the apparatus and making it able to be sized for any desired capacity without developing of needless hydraulic flows. These walls 9 are attached to the tank wall by any reasonable means.

The diffusers 5 are connected through the bottom 6 of tank 1 to an electrostatic charger 7 through piping 8. The electrostatic charger 7 has an upper opening 20 through which one or more powdered chemicals fall in from the feeder hopper 10. The diffusers 5 are driven by electric motors 11 with a hollow shaft as shown in FIG. 1, or by any known system as pulleys, gears, etc. Packing glands 18 and 19 have to be used.

Also at the bottom 6 there are several outlets 12 connected through pipes 13 and 14 to the clarified liquid collector 15 where the liquid level is regulated. From here the clarified liquid goes out of the unit through outlet 16.

The electrostatic charger 7 must have controls to regulate the required voltage, and to change from positive to negative or vice versa the electrical charge added to the chemical or chemicals.

According to the above explanation, I am going to explain how my invention works:

The liquid to be clarified comes in through inlet distributor 4 and starts descending. If more than one chemical is added to the liquid, it may be added before inlet 4, but at least one powdered chemical or a portion of it must be added through the gas diffusers 5, in order to obtain the electrical charges we need for producing a good equilibrium within the liquid and the matter we are trying to eliminate.

At the same time that the liquid is descending, gas or air comes in through the opened top 20 of the electrostatic charger 7, entraining the powdered chemical or chemicals falling from the feeder hopper 10, passing through the electrostatic charger 7 where the powdered chemical is charged with the required charge, continuing through pipe 8 until it reaches gas diffusers 5 from which it passes toward the liquid where it is diffused in small gas or air bubbles carrying the charged powdered chemicals. The latter starts ascending within the gas or air bubbles and adhering to the matter descending with the liquid until it reaches skimmer 2 which will remove this froth through outlet 3.

The descending liquid will loose all its flocculated or being flocculated matter proportionally to the coincidence of said matter with charged particles, then passing between the gas diffusers and reaching outlets 12, pipes 13 and 14, collector ring 15 and outlet 16. Drain pipe 21 will be used in case heavy particle deposit occurred on the bottom 6 or for cleaning the unit. A blind flange or a valve must be used.

The vertical partitions 9 could be spaced less than 1 foot apart if required by hydraulic flows. Also, if the inlet distributor 4 and outlets 12 are well designed to produce a good laminar flow and in order to make smaller the distance between them, the vertical partitions 9 may be eliminated. It must be understood that the chemicals added through inlet 4 could be in the liquid form if required.

Figure 3:
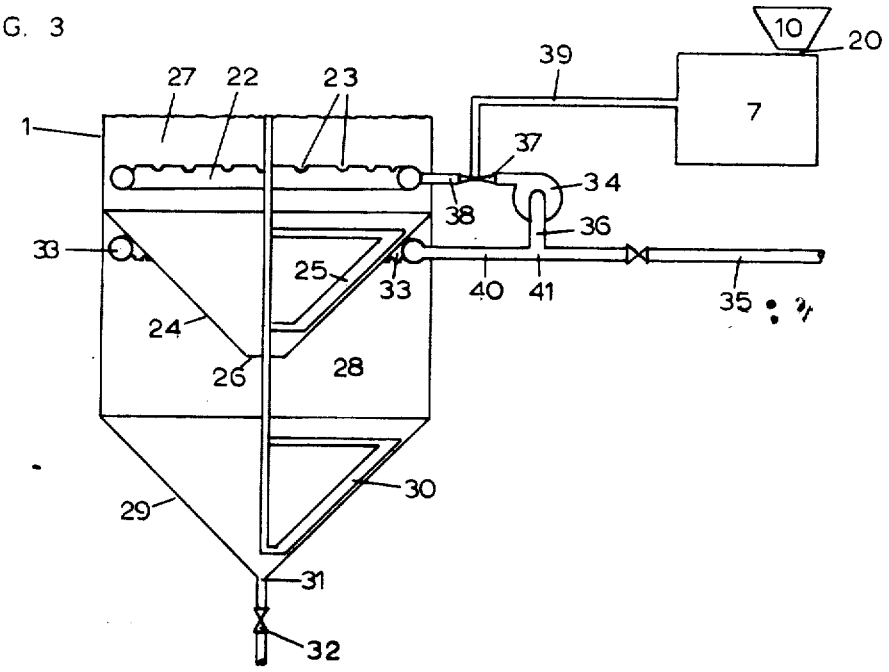
FIG. 3 is an elevation of another embodiment of the present invention.

FIG. 3 is a description of another embodiment of the present invention where only the lower part of the unit has been drawn; from the space in FIG. 1 between vertical partitions 9 and circular gas diffusers 5 down.

The differences with the embodiment in FIG. 1 are:

Instead of the rotatory gas diffuser 5 we have installed another distributor ring 22 which has holes 23 in order to distribute uniformly the incoming fluid. Underneath this ring there is a cone 24 with a scraper 25 and a hole 26. This cone 24 divides the tank 1 into two chambers, the upper 27 and the lower 28, interconnected by hole 26. The lower chamber has also a coned bottom 29 with a scraper 30 at the bottom and an outlet 31 at the lower end of said cone 29 and a drain valve 32. At the top of this lower chamber 28 there is a collector ring 33 to collect the clarified liquid, which is connected through pipe 40 to service line 35 and pump 34.

After the pump 34, there is an air injector 37 to entrain air or gas from the electrostatic charger 7. The air injector 37, pipes 38 and 39, and distributor ring 22 must be made preferably of plastic.

How it works: The liquid to be clarified gets in through distributor 4 and starts descending through vertical partitions 9, passes by distributor ring 22 and continues downward through hole 26 to the lower chamber 28. There it makes a vertical U-turn and starts ascending until it reaches the collector ring 33. From here the liquid goes through pipe 40 to T 41 where it is divided in two streams. One goes through pipe 35 as clarified liquid to service, and the smaller portion goes to pump 34. From here to the air or gas injector 37 where air or gas, mixed with the electrical charged chemical or chemicals is entrained and mixed with the liquid, then continuing through pipe 38, distributor ring 22 and holes 23 toward the upper chamber 27.

After entering chamber 27 the mixed fluids are separated in the liquid which goes downward, repeating the cycle, and the air or gas bubbles that float and start ascending, attracting the already formed or being formed floc, and carrying it upward to the skimmer 2 and outside the unit through collecter 3. The scrapers 25 and 30 could be of the chain type. The embodiment of FIGS. 1, 2 and 3 are better applied to liquids with relative high viscosity where large air or gas bubbles can be produced as is currently done in the clarifiers used by some sugar refineries, where they do not produce small air or gas bubbes but relative large bubbles because the probabilities for an electrical charged chemical floating within the air or gas bubbles to be discharged by contact with the surrounding liquid are smaller for a large bubble than for a small one.

Figure 4:
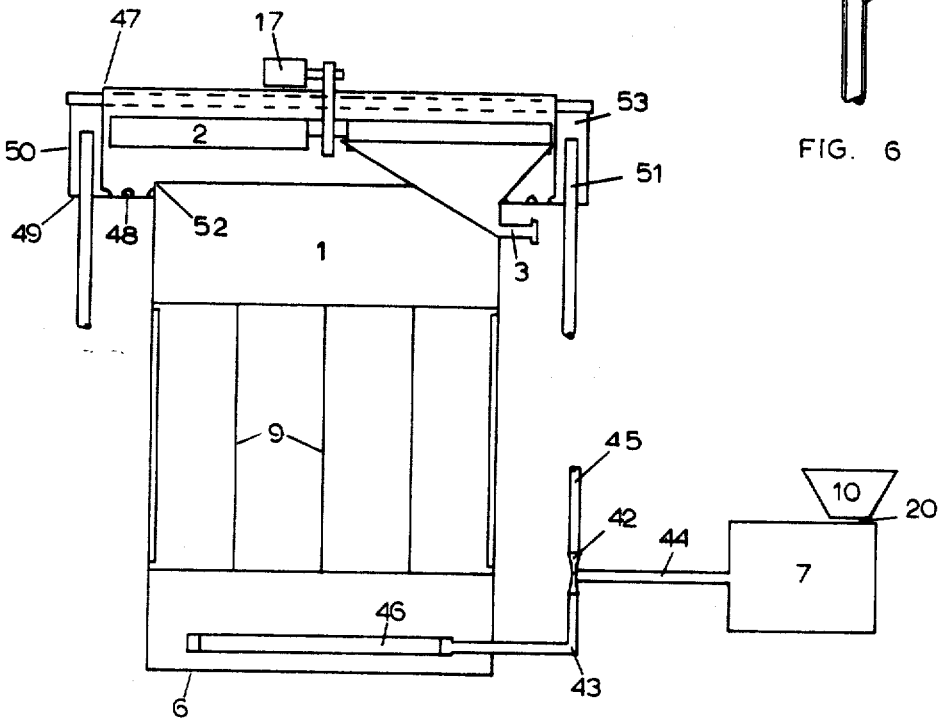
FIG. 4 is an elevation of another embodiment of the present invention.

Another embodiment of the present invention is shown in FIG. 4. This embodiment is similar to the one shown in FIG. 1, but the bubbles are not in countercurrent with the liquid being clarified. They both flow upwardly in the same direction.

This apparatus is made up of tank 1 and vertical walls 9 as in FIG. 1, at the bottom has a distributor 46, which in this case not necessarily has to be of the same type as described in FIG. 1, but could just be a standard distributor or just a pipe with holes to distribute uniformly the flow, because in this case the bubbles have already been formed by the ejector 42. At the top of tank 1 there is a circular, vertical wall 47 concentric with tank 1 and with holes at the bottom 48 resting on the bottom 49 of an annular tank 50 of a diameter larger than the diameter of tank 1, and with outlets 51. Also at the top of the tank 1, there is the skimmer 2 with its overflow 3 and electric motor 17. Above bottom 6, there is the pipe 43 to connect the distributor 46 to ejector 42. The latter is connected through pipe 44 to the electrostatic charger 7 with its feeder hopper 10, and through pipe 45 to the liquid being treated which must have enough pressure to make the ejector 42 work. Ejector 42 and pipes 45, 44, and 43, and distributor 46 must be made of plastic or other insulating material.

How this embodiment works: After mixing the liquid being treated with one or more chemicals as required and which must be at the minimum pressure required by the ejector 42 to work properly, the same will flow through pipe 45 and ejector 42 where it will draw air or gas and form bubbles. As explained in relation to FIG. 1, this air or gas entrains one or more electrostatic charged chemicals. Thus, when the air or gas bubbles are formed, they carry with them some of the electrostatically charged powdered chemical which makes the air or gas bubble to be a negatively or postively charged bubble. Other chemicals, if needed, have been added to the liquid and have flocculated or started to flocculate when they arrive to the ejector 42. Therefore, if the electrostatic charge of the powdered chemical being entrained by the air or gas has been properly charged, it will be attracted toward the floc while flowing through pipe 43 and distributor 46 and into the liquid inside the lower part of tank 1. Then, the liquid being treated and the floc and air or gas bubbles will ascend through walls 9 until reaching the top 52 of the tank 1 proper. At this point the floc and air or gas bubbles continue its upward movement. However, the liquid will flow over the top 52 toward the circular vertical wall 47 with a horizontal flow, which helps in separating the floc from the liquid proper. The circular wall 47 with its holes 48 at the bottom, forces the liquid to travel downwardly until passing through holes 48 and entering in the outer circular ring-type chamber 53 where is located the outlet 51 which has means with vertical movement in order to regulate the liquid level of the apparatus. The floc and air or gas bubbles that keeps moving upwardly, accumulate at the top of the liquid and form a float which is pushed towards the outlet 3 by the skimmer 2.

Figure 5:
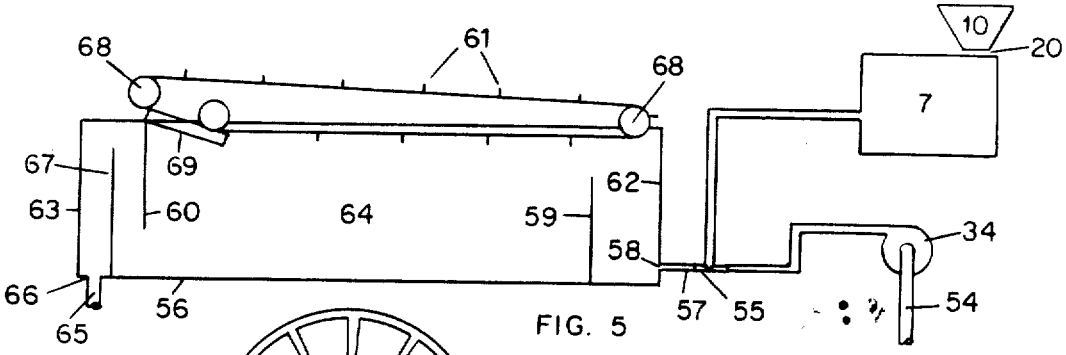
FIG. 5 is an elevation of still another embodiment of the present invention.
Figure 7:
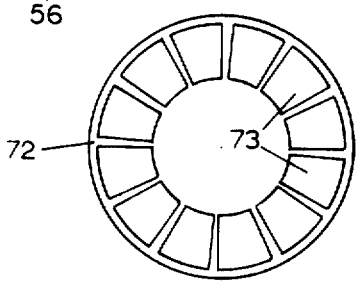
FIG. 7 is a top view of the diffuser shown in FIG. 6.
Figure 6:
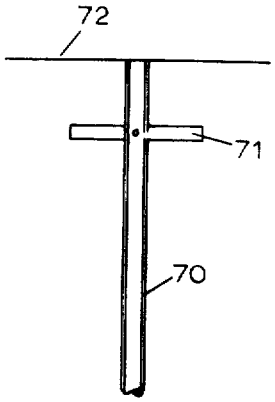
FIG. 6 is an elevation of the type of diffuser 5 shown in FIG. 1.

Still another embodiment of the present invention is the application of the principle of the electrostatic charger to a standard flotation clarifier like the one shown in FIG. 5 or similar unit. This embodiment refers to a unit for separating solids is floc and fiber from liquids, of the type wherein the suspension is caused to flow substantially in a horizontal direction, through a separating container 64 which is opened at the top and is made of four exterior verical walls of which 62 and 63 correspond to the end vertical walls and a horizontal plane bottom 56. It is provided with an inlet opening 58 in the end wall 62 for the liquid to be purified and an outlet opening 66 at the bottom and near the end wall 63. Within the above container there are three vertical baffles 59, 60 and 67. At the top of the separating container there is a skimmer assembly 68 with paddles 61 and an inclined plane 69 at the left end of FIG. 5, to take off from the liquid the floating floc or fiber. At the right of FIG. 5 there are an ejector 55, a pump 34 and the electrostatic separator 7 with its feeder hopper 10.

How it works: The liquid that is going to be treated is mixed with the necessary chemical or chemicals except for one chemical or part of it which is fed through the electrostatic separator 7 as explained in relation to FIGS. 3 and 4. After the above mentioned mixing, it is fed through pipe 54 to the pump 34 and ejector 55. The pump 34 gives to said liquid the minimum pressure required to make work the ejector 55. The ejector 55 draws air or gas mixed with one electrically charged powdered chemical from the electrostatic charger 7, and the air or gas is bubbled in the liquid where floc formation is taking place. If the right charge was added to the bubbles a good adhesion of floc and bubbles will take place and after flowing in the flotation unit proper 64, the liquid will pass over baffle 59 and the floc will float and separate from the liquid. After arriving the floating floc or float at the liquid top level, it will be pushed toward the incline plane 69 by the paddles 61 and out of the unit through proper means. The liquid left in the unit will run toward wall 60 and will pass under it, then due to the baffle 67 it will have to pass over it and fall down toward outlet 66 and out of the unit through pipe 65. It will be obvious to one skilled in the art that various changes may be made in the invention without departing from the spirit and scope thereof and therefore, the invention is not limited by those which are illustrated in the drawings and described in the specifications.

What is claimed is:.

1. A method for clarifying liquid[-] containing matter to be removed therefrom, said matter being selected from the group consisting of *floc*, fibers, *partially or totally formed floc*, and partically or totally flocculated fibers, said method comprising the steps of:
   1. introducing into said liquid a flow of gas bubbles having contained within the individual bubbles at least one powdered chemical particle having an electrical charge of the opposite polarity as the matter to be removed from the liquid to be clarified, said powdered chemical also being a flocculating agent for the matter to be removed in the event said matter to be removed is not otherwise flocculated;
   2. providing means to insure uniform mixing of said gas bubbles throughout said liquid to be clarified; and
   3. subsequently removing from the surface of said liquid the conglomerate formed by adherence of said now flocculated matter to be removed from said liquid with the powdered chemicals introduced into said liquid in said gas bubbles, thus leaving a clarified liquid behind.

2. The method of claim 1 wherein said powdered chemicals are provided with the proper electrical charge by an electrostatic charger.

3. The method of claim 2 wherein the flow of gas bubbles is countercurrent the flow of liquid being clarified of matter.

4. The method of claim 1 wherein said matter to be removed from said liquid is partially or wholly flocculated at the time of the introduction thereinto of said powdered chemical-containing gas bubbles.

(References on following page)

References Cited

The following references, cited by the Examiner, are of record in the patented file of this patent or the original patent.

UNITED STATES PATENTS

| | | | |
|---|---|---|---|
| 1,840,267 | 1/1932 | Tschudy | 209—166 |
| 3,117,082 | 1/1964 | Schluter | 210—221 |

| | | | |
|---|---|---|---|
| 3,147,217 | 9/1964 | Halton | 210—44 |
| 3,479,281 | 11/1969 | Kikindai et al. | 210—44 |

U.S. Cl. X.R.
204—149; 209—166; 210—221.

THOMAS G. WYSE, Primary Examiner